(12) United States Patent
Chen et al.

(10) Patent No.: US 9,153,831 B2
(45) Date of Patent: Oct. 6, 2015

(54) ELECTRODE DESIGN FOR LOW TEMPERATURE DIRECT-HYDROCARBON SOLID OXIDE FUEL CELLS

(75) Inventors: Fanglin Chen, Irmo, SC (US); Fei Zhao, Columbia, SC (US); Qiang Liu, Columbia, SC (US)

(73) Assignee: University of South Carolina, Columbia, SC (US)

( * ) Notice: Subject to any disclaimer, the term of this patent is extended or adjusted under 35 U.S.C. 154(b) by 749 days.

(21) Appl. No.: 12/898,794

(22) Filed: Oct. 6, 2010

(65) Prior Publication Data

US 2011/0081596 A1 Apr. 7, 2011

Related U.S. Application Data

(60) Provisional application No. 61/278,381, filed on Oct. 6, 2009.

(51) Int. Cl.
*H01M 8/12* (2006.01)
*H01M 4/86* (2006.01)
*H01M 4/88* (2006.01)
*H01M 4/90* (2006.01)
*H01M 4/92* (2006.01)
*H01M 8/10* (2006.01)

(52) U.S. Cl.
CPC .......... *H01M 8/1213* (2013.01); *H01M 4/8605* (2013.01); *H01M 4/8621* (2013.01); *H01M 4/8885* (2013.01); *H01M 4/905* (2013.01); *H01M 4/9016* (2013.01); *H01M 4/9033* (2013.01); *H01M 4/9066* (2013.01); *H01M 4/925* (2013.01); *H01M 8/1004* (2013.01); *H01M 8/1226* (2013.01); *Y02E 60/521* (2013.01); *Y02E 60/525* (2013.01); *Y10T 156/10* (2015.01)

(58) Field of Classification Search
CPC ............ H01M 4/8605; H01M 4/8621; H01M 4/8885; H01M 4/9016; H01M 4/9033; H01M 4/9066; H01M 4/925; H01M 8/1004; H01M 8/1213; H01M 2008/1095; H01M 2008/1293; H01M 4/905; H01M 8/1226; Y02E 60/525
USPC ......... 429/532, 484, 486, 489, 483, 482, 535; 427/115
See application file for complete search history.

(56) References Cited

FOREIGN PATENT DOCUMENTS

JP 2001-256986 * 9/2001

OTHER PUBLICATIONS

Yoshioka et al. "Ionic conductivity and fuel cell properties of apatite-type lanthanum silicates doped with Mg and containing excess oxide ions", Solid State Ionics (2008), 179(38), 2165-2169.*

(Continued)

*Primary Examiner* — Laura Weiner
(74) *Attorney, Agent, or Firm* — Dority & Manning, P.A.

(57) ABSTRACT

In certain embodiments of the present disclosure, a solid oxide fuel cell is described. The solid oxide fuel cell includes a hierarchically porous cathode support having an impregnated cobaltite cathode deposited thereon, an electrolyte, and an anode support. The anode support includes hydrocarbon oxidation catalyst deposited thereon, wherein the cathode support, electrolyte, and anode support are joined together and wherein the solid oxide fuel cell operates a temperature of 600° C. or less.

5 Claims, 6 Drawing Sheets

(56) References Cited

OTHER PUBLICATIONS

Nakayama et al. "Fabrication and fuel-cell properties of Sm-doped CeO2 electrolyte film by electrophoretic deposition", Key Engineering Materials (2007), 350(Electroceramics in Japan X), 175-178.*

U.S. Appl. No. 61/201,253, filed Dec. 9, 2008, Liu et al., Method to Synthesize Porous Metal Oxide.

Brinker et al., "Evaporation-Induced Self-Assembly: Nanostructures Made Easy", Advanced Materials, vol. 11, Issue 7, May 1999, pp. 579-585.

Bruce et al., "The Influence of Current Density on the Electrocatalytic Activity of Oxide-Based Direct Hydrocarbon SOFC Anodes", Journal of the Electrochemical Society, vol. 155, Issue 11, 2008, pp. B1202-B1209.

Cable et al., "A Symmetrical, Planar SOFC Design for NASA's High Specific Power Density Requirements", Journal of Power Sources, Nov. 2007, vol. 174, Issue 1, pp. 221-227.

Chen et al., "Preparation of Ordered Macroporous $Sr_{0.5}Sm_{0.5}CoO_3$ as Cathode for Solid Oxide Fuel Cells", Chemistry Letters, vol. 30, Issue 10, 2001, pp. 1032-1033.

Everett, IUPAC Manual of Symbols and Terminology for Physiochemical Quantities and Units, Pure and Applied Chemistry 1972, vol. 31, No. 4, pp. 579-638.

Kim et al., "Fabrication of Hollow Palladium Spheres and Their Successful Application to the Recyclable Heterogeneous Catalyst for Suzuki Coupling Reactions", Journal of the American Chemical Society, Jun. 2002, vol. 124, No. 26, pp. 7642-7643.

Liu et al., "Self-Rising Approach to Synthesize Hierarchically Porous Metal Oxides", Materials Research Bulletin, vol. 44, Issue 11, Nov. 2009, pp. 2056-2061.

Liu et al., "Synthesis and Application of Porous $Sm_{0.2}Ce_{0.8}O_{1.9}$ Nano-Crystal Aggregates", Journal of Physical Chemistry, vol. 113, No. 39, Sep. 2009, pp. 17262-17267.

Liu et al., "Synthesis, Characterization and Application of Nanostructured Porous Metal Oxides", ECS Transactions 2009, vol. 19, Issue 15, pp. 1-8.

Lu et al., "Freeze Casting as a Nanoparticle Material-Forming Method", International Journal of Applied Ceramic Technology, vol. 5, Issue 3, May 2008, pp. 219-227.

Mamak et al., "Self-Assembling Solid Oxide Fuel Cell Materials: Mesoporous Yttria-Zirconia and Metal-Yttria-Zirconia Solid Solutions", Journal of the American Chemical Society, vol. 122, No. 37, Sep. 2000, pp. 8932-8939.

McCamish, "The Rise of Self-Rising Flour: A Recipe for Success", Journal of Chemical Education, vol. 64, No. 8, Jul. 1987, pp. 710-712.

Sadakane et al., "Facile Preparation of Three-Dimensionally Ordered Macroporous Alumina, Iron Oxide, Chromium Oxide, Manganese Oxide, and Their Mixed-Metal Oxides with High Porosity", Chemistry of Materials, vol. 19, No. 23, Oct. 2007, pp. 5779-5785.

Steele et al., "Material Science Aspects of SOFC Technology with Special Reference to Anode Development", Solid State Ionics, vol. 40-41, Part 1, Aug. 1990, pp. 388-393.

Toberer et al., "Template-Free Routes to Porous Inorganic Materials", Chemical Communications, vol. 30, Aug. 2006, pp. 3159-3165.

Wang et al., "Preparation and Performance of Nanostructured Porous Thin Cathode for Low-Temperature Solid Oxide Fuel Cells by Spin-Coating Method", Journal of Power Sources, vol. 175, No. 1, Jan. 2008, pp. 430-435.

Xia et al., "Reduced-Temperature Solid Oxide Fuel Cells Fabricated by Screen Printing", Electrochemical and Solid-State Letters 2001, vol. 4, Issue 5, pp. A52-A54.

Zhang et al., "$Sm_{0.5}Sr_{0.5}CoO_3 + Sm_{0.2}Ce_{0.8}O_{1.9}$ Composite Cathode for Cermet Supported Thin $Sm_{0.2}Ce_{0.8}O_{1.9}$ Electrolyte SOFC Operating Below 600° C.", Journal of Power Sources, vol. 160, No. 2, 2006, pp. 1211-1216.

Zhao et al., "Novel Nano-Network Cathodes for Solid Oxide Fuel Cells", Journal of Power Sources, vol. 185, No. 1, Oct. 2008, pp. 13-18.

* cited by examiner

Table 1. Peak power density and interfacial polarization resistance ($R_p$) of anode-supported SOFCs with different cathode tested at 500°C

| Power density (Wcm$^{-2}$) | $R_p$ ($\Omega$cm$^2$) | Cell components | | |
|---|---|---|---|---|
| | | Cathode | Electrolyte | Anode |
| 0.19 | 1 | Cobaltite-SDC composite | SDC | Ni-SDC |
| 0.25 | 0.5 | Cobaltite-SDC composite | SDC | Ni-SDC |
| 0.21 | 0.79 | Cobaltite-SDC composite | SDC | Ni-SDC |
| 0.44 | 0.21 | Impregnated cobaltite cathode | SDC | Ni-SDC |

FIG. 9

ELECTRODE DESIGN FOR LOW TEMPERATURE DIRECT-HYDROCARBON SOLID OXIDE FUEL CELLS

CROSS-REFERENCE TO RELATED APPLICATION

The present application is based on and claims priority to U.S. Provisional Application 61/278,381 having a filing date of Oct. 6, 2009, which is incorporated by reference herein.

GOVERNMENT SUPPORT CLAUSE

This invention was made with government support under DE-FG36-08GO88116 awarded by the U.S. Department of Energy and under award NNX07AL01A awarded by NASA. The government has certain rights in the invention.

BACKGROUND

Solid oxide fuel cells (SOFCs) have the potential to convert the chemical energy in fuels, including hydrocarbon fuels, directly to electricity as schematically shown in FIG. 1. However, the cost of current SOFC systems is still prohibitive for wide-spread commercial deployment. Reducing the operating temperature of the current SOFC systems to 400-600° C. can dramatically reduce the cost of the SOFC technology since relatively inexpensive metallic components can be used for interconnects, heat exchangers, manifolding and other structural components of the SOFC system. Lowering the operation temperature can also offer quick start-up ability, which in turn can enable their use in applications such as transportable power sources and auxiliary power units for automobiles. A lower operating temperature would also ensure a greater overall system stability and durability due to a reduction in the thermal stresses in the active ceramic structures, leading to a longer expected lifetime for the SOFC system.

Eliminating the external hydrocarbon reforming system that generates hydrogen, and directly utilizing hydrocarbon fuels on the anode will increase SOFC efficiency while decreasing the complexity and cost of the SOFC system. However, the current state-of-the-art Ni-based anode deactivates rapidly with direct utilization of hydrocarbon fuels due to carbon deposition on the Ni catalyst surface. Further, SOFC performance becomes unacceptably low at reduced temperature with conventional SOFC technology. However, by controlling the microstructure of the electrode, it is possible to achieve high cell performance at reduced operating temperature and to utilize Ni-based anode materials for direct hydrocarbon oxidation.

In view of the above, a need exists for high performance low temperature direct-hydrocarbon SOFCs.

SUMMARY

In the present disclosure, novel electrode engineering is described to realize high performance low temperature direct-hydrocarbon SOFCs. An innovative SOFC architecture combines highly active cobaltite-based mixed ionic and electronic conducting cathodes with carbon deposition mitigated Ni-based anodes. Further, hierarchically porous microstructure can be created to enhance the electrode performance.

In certain embodiments of the present disclosure, a solid oxide fuel cell is described. The solid oxide fuel cell includes a hierarchically porous cathode support having an impregnated cobaltite cathode deposited thereon, an electrolyte, and an anode support. The anode support includes hydrocarbon oxidation catalyst deposited thereon, wherein the cathode support, electrolyte, and anode support are joined together and wherein the solid oxide fuel cell operates a temperature of 600° C. or less.

In other embodiments of the present disclosure, a method for forming a solid oxide fuel cell is described. The method includes forming a hierarchically porous cathode support, and depositing an impregnated cobaltite cathode thereon.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which:

FIG. 9 presents a table of values for power density and interfacial polarization resistance (Rp) of anode-supported SOFCs with different cathode tested at 500° C.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

Figure 1:
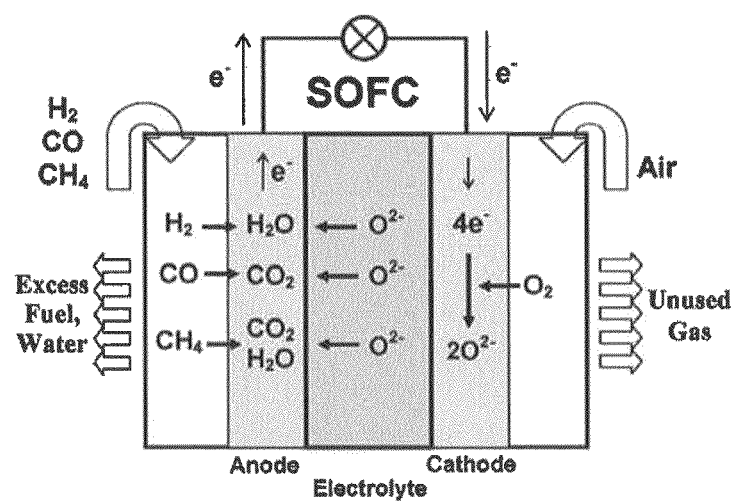
FIG. 1 illustrates principles of SOFC operation in accordance with certain aspects of the present disclosure.
Figure 2:
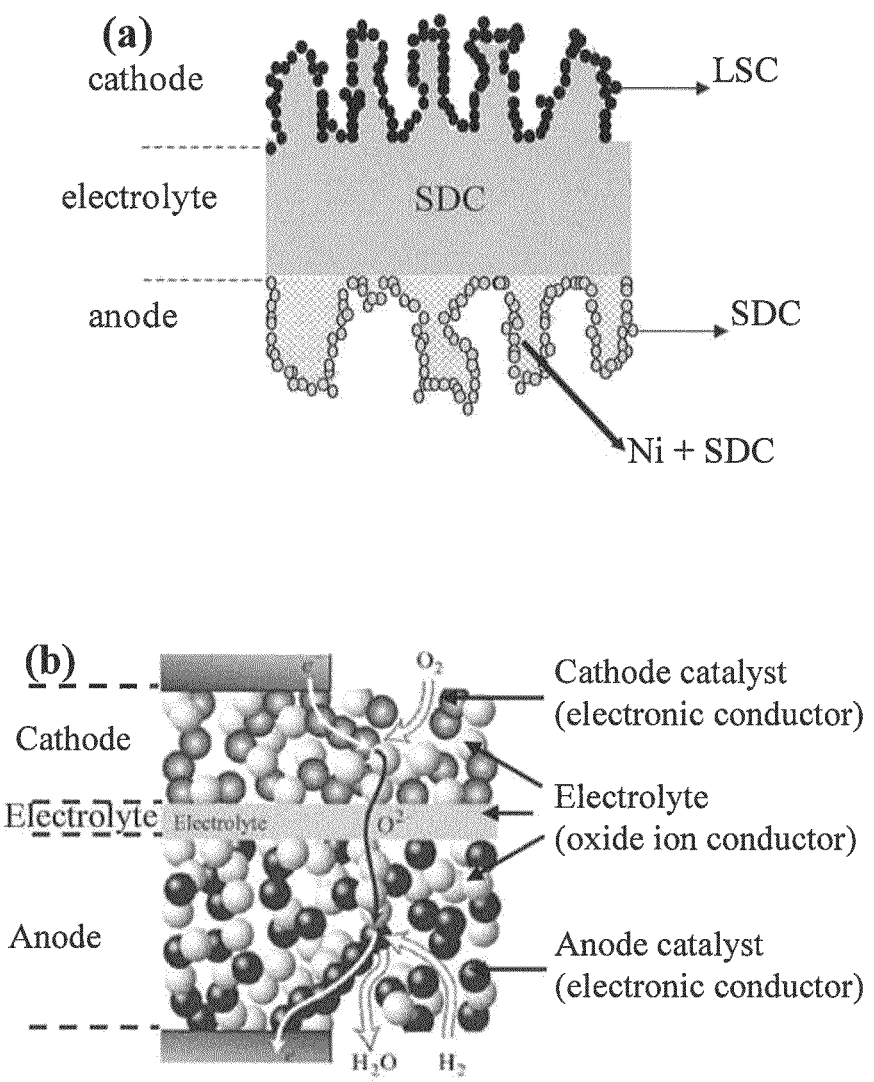
FIG. 2 illustrates a schematic of a novel (a) and a traditional (b) electrode architecture in accordance with certain aspects of the present disclosure.

Among the perovskite-type cathode materials for SOFCs, cobaltite has the highest surface oxygen exchange coefficient, oxide ion conductivity as well as electronic conductivity at reduced operating temperatures. These are the factors favorable for oxygen reduction reaction for a high performance cathode material. In order to overcome the barriers of thermal expansion mismatch as well as chemical interdiffusion issues, a novel cathode architecture using a composite of the cobaltite catalyst and the electrolyte material is described herein in accordance with the present disclosure. As shown in FIG. 2(a), the electrolyte material is SDC (samaria doped ceria) and the cathode catalyst is LSC ($La_{0.6}Sr_{0.4}CoO_3$). At low operating temperatures, SDC has high oxide ion conductivity while LSC has the highest electrocatalytic activity for oxygen reduction. A porous SDC layer (cathode frame) is formed on the dense SDC electrolyte. The SDC substrate layer can be formed by tape casting or any other suitable method as would be known in the art while the SDC electrolyte layer can be prepared using screen printing (or tape casting or any other suitable method as would be known in the art). On top of the SDC electrolyte layer, an SDC-NiO anode substrate layer can be formed by tape casting. After high-temperature co-sintering of the triple layers, porous cathode and anode frames are formed on both sides of the dense SDC electrolyte. Nanosized LSC particles are attached on the surface of the porous SDC cathode frame while SDC nanoparticles are attached to the porous Ni-SDC anode substrate. Both the LSC and the SDC nanoparticles are formed by an impregnation method or any other suitable method as would be known in the art. The proposed novel electrode architecture of the present disclosure has many improved characteristics over conventional electrode architecture.

For instance, the electrode architecture of the present disclosure has superior thermal cycling capability. The porous SDC cathode frame, the dense SDC electrolyte and the porous Ni-SDC porous anode frame are co-sintered to form an integral part and are well matched in thermal expansion, consequently eliminating cracking and delamination between the electrode and the electrolyte. For comparison, the traditional cathode has a clear physical interface between the cathode and the electrolyte, as shown in FIG. 2(b), resulting in significant thermal stresses and causing poor thermal cycling behavior.

The electrode architecture of the present disclosure also has enhanced oxide ion conductivity. SDC is an excellent oxide ion conductor at reduced operating temperatures (400-600° C.). The electrode architecture of the present disclosure provides an uninterrupted oxide ion conduction path from the electrode to the electrolyte and will greatly enhance the oxide ion conduction compared with the composite electrode microstructure currently used for SOFCs, as shown in FIG. 2(b).

In addition, the electrode architecture of the present disclosure has high cathode electronic conductivity and electrocatalytic activity. LSC has the highest electronic conductivity among all the reported perovskite-type oxides. The interconnected LSC nanoparticles form an uninterrupted electron conduction path, minimizing the ohmic losses in the cathode layer. LSC has the highest surface oxygen exchange coefficient which promotes oxygen reduction reaction at the cathode. In addition, nanosized LSC particles have large surface areas which further enlarge the oxygen reduction sites and consequently enhance the oxygen reduction process.

Since LSC nanoparticles are prepared on the surface of the SDC cathode frame through impregnation with low firing temperatures (~700° C.) and are uniformly attached to the surface of the porous SDC cathode frame and form only a thin layer, there is a large bonding surface and relatively strong bonding strength between LSC nanoparticles and the surface of the porous SDC cathode frame, consequently preventing delamination induced from the thermal stress during thermal cycling.

The electrode architecture of the present disclosure also has superior electronic and ionic conductivity for the anode. Since the anode substrate is Ni-SDC, the electronic conductivity of the proposed anode architecture shown in FIG. 2(a) is high. Further, SDC nanoparticles form a continuous coating layer on the porous Ni-SDC anode frame, providing an interrupted oxide ionic conducting path from the electrolyte to the anode, as shown in FIG. 3.

Figure 3:
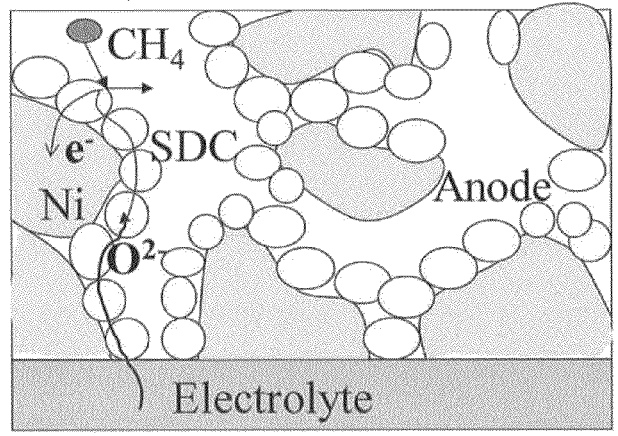
FIG. 3 illustrates an anode surface in accordance with certain aspects of the present disclosure.

The porous Ni-SDC anode substrate is coated with SDC nanoparticles, as shown in FIG. 3. SDC has demonstrated catalytic activity for direct oxidation of hydrocarbon fuels. Nanosized SDC will further enhance the direct hydrocarbon oxidation kinetics. Steam generated from direct oxidation of the hydrocarbons will facilitate internal hydrocarbon reforming on the Ni surface. Even when carbon is formed on the Ni surface, SDC in the porous anode composite substrate will remove the carbon deposit since ceria is a good catalyst to remove carbon through the following reaction:

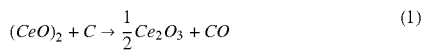

$$(CeO)_2 + C \rightarrow \frac{1}{2}Ce_2O_3 + CO \tag{1}$$

The present disclosure can be better understood with reference to the following examples.

EXAMPLES

Novel Self-rising Approach to Prepare Hierarchically Porous Electrode

Figure 4:
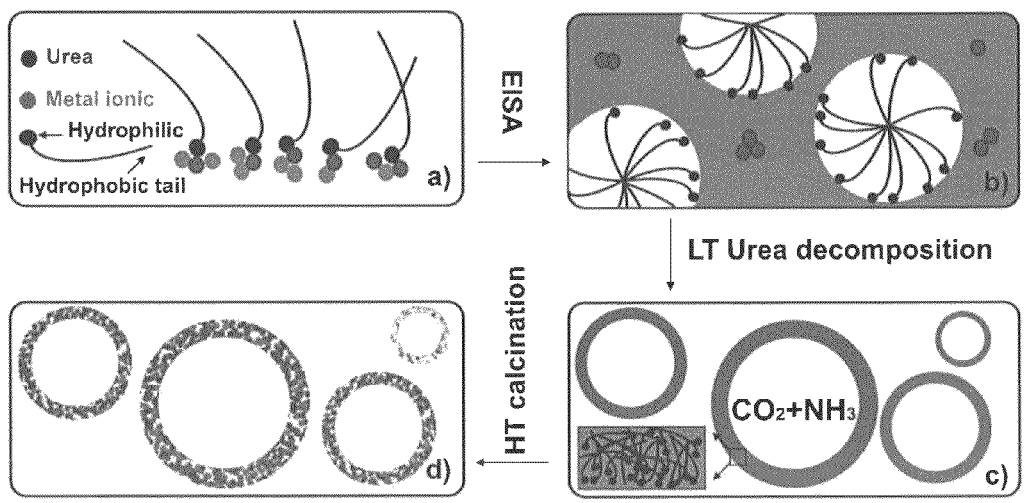
FIG. 4 illustrates schematic illustrations of the self-rising approach in accordance with certain aspects of the present disclosure.

Hierarchically porous materials displaying multiple length scales in pore size are desirable for their improved flow performance coupled with high surface areas. Macropores (pore size>50 nm) provide channels for gas and mass transport while mesopores (pore size in the range of 2-50 nm) provide large surface areas for interaction and reaction. Macropores can be prepared by templating methods such as silica or polystyrene beads (see, e.g., Kim, S. W.; Kim, M.; Lee, W. Y.; Hyeon, T. "Fabrication of Hollow Palladium Spheres and Their Successful Application to the Recyclable Heterogeneous Catalyst for Suzuki Coupling Reactions", Journal of the American Chemical Society 2002, 124, 7642 and Chen, F.; Xia, C.; Liu, M. "Preparation of Ordered Macroporous $Sr_{0.5}Sm_{0.5}CoO_3$ as Cathode for Solid Oxide Fuel Cells", Chemistry Letters 2001, 10, 1032, both incorporated by reference herein). However, the limitations of such methods are obvious: "hard templates" which require complicated preparation sequences are always needed, thus significantly increasing the cost for producing hierarchically porous materials at large scale. A novel self-rising approach to make hierarchically porous material has been developed as illustrated in FIG. 4. The method of the present disclosure utilizes a similar mechanism to that of self-rising flours used in a bakery. Urea has been chosen as the leavening agent to obtain macropores because urea will decompose to only gases ($NH_3$ and $CO_2$), consequently avoiding impurities and contamination of the final product. The preparation of mesopores is achieved through the evaporation-induced self assembly (EISA) method (see, e.g., Brinker, C. J.; Lu, Y. F.; Sellinger, A.; Fan, H. Y. "Evaporation-Induced Self-Assembly: Nanostructures Made Easy", Advanced Materials 1999, 11, 579 and Liu, Q.; Chen, F.; Song, W. "Synthesis, Characterization and Application of Nanostructured Porous Metal Oxides", ECS Transactions 2009, both incorporated by reference herein). In the EISA method, during solvent evaporation, the self-assembly process is triggered when the concentration of the surfactant in the solution begins to exceed the critical micelle concentration. Upon high temperature calcination, the template is removed and the ordered mesoporous materials can be obtained.

Preparation of the Electrolyte/electrode Frame

Figure 5:
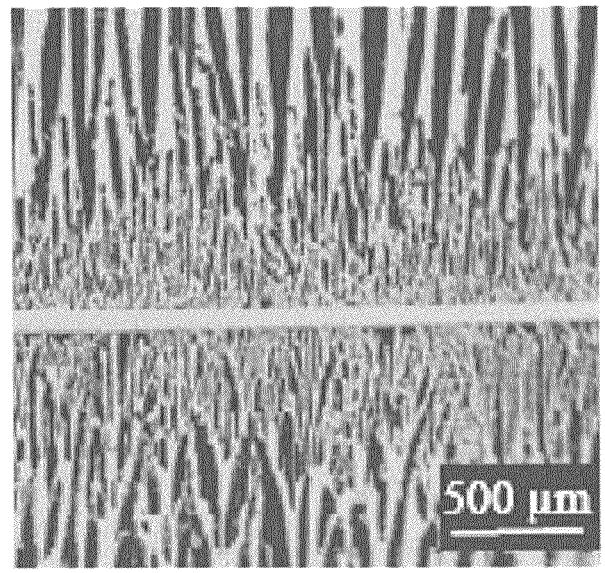
FIG. 5 illustrates a cross-sectional microstructure for cells made from a freeze-drying process in accordance with certain aspects of the present disclosure.

Electrode substrate supported cells are first fabricated using a freeze-drying approach. Although the freeze-drying process has long been used for ceramic processing, its application in SOFC fabrications is relatively new (see, e.g., Cable, T. L.; Sofie, S. W. "A Symmetrical, Planar SOFC Design for NASA's High Specific Power Density Requirements", Journal of Power Sources 2007, 174, 221, incorporated by reference herein). The porous electrode support is fabricated using the freeze-tape casting process while the electrolyte is screen-printed on the electrode support. The electrode-support and the electrolyte assembly are co-sintered. The freeze-drying method renders better control of the porous electrode frame microstructure, as shown in FIG. 5. The SDC electrolyte film is about 10 µm thick. Porous electrode frame is formed on both sides of the electrolyte layer, and the electrode frame and the electrolyte are an integral part.

The microstructural characteristics of the electrode substrate layer, including the thickness, porosity, surface area, pore size and pore size distribution are correlated with the particle size of the starting SDC and NiO powders, organic additives, the drying and heat-treatment processes. The electrode substrate frame is the platform where the electrode catalyst is deposited via impregnation. Therefore, the microstructure of the electrode substrate frame has direct influences on the effective catalyst loading and consequently the electrocatalytic performance of the electrode.

Preliminary Results

Figure 6:
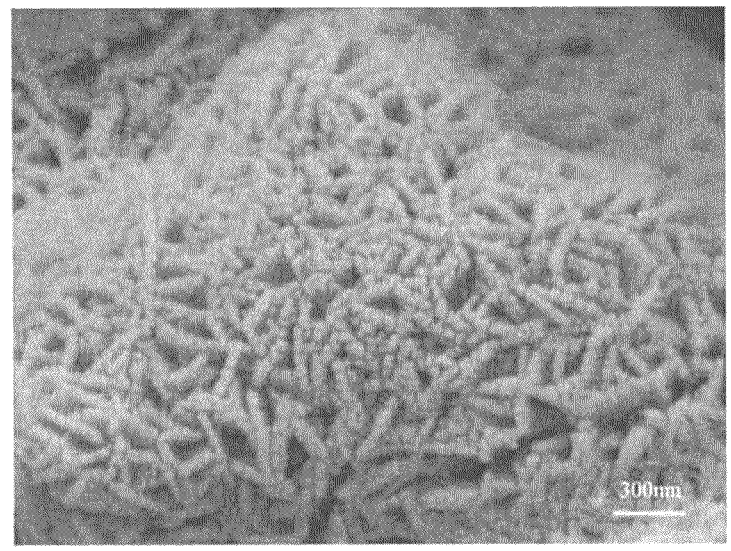
FIG. 6 illustrates a cross-sectional microstructure for cathode with nano-network structure in accordance with certain aspects of the present disclosure.

Shown in FIG. 6 is an SEM image of cobaltite nanoparticles on the surface of a porous SDC cathode frame. The cathode catalyst precursor is deposited onto the surface of the porous SDC cathode frame by impregnating porous SDC cathode frame with the respective metal nitrate solution, drying, and subsequent firing at about 700° C. The nano-network structure is formed by heating the impregnated precursors. The nano-sized cobaltite particles are well-connected, forming straight conducting paths for oxygen ion and electron conduction. In addition, the nano-network has high porosity for oxygen transport. The performance of a single anode-supported SOFC using the impregnated cobaltite cathode deposited on the surface of porous SDC cathode frame (see, e.g., Zhao, F.; Wang, Z.; Liu, M.; Zhang, L.; Xia, C.; Chen, F. "Novel Nano-network Cathodes for Solid Oxide Fuel Cells", Journal of Power Sources 2008, 185, 13, incorporated by reference herein), thin film SDC electrolyte and Ni-SDC anode tested at 500° C., with humidified hydrogen as fuel is shown in Table 1 (FIG. 9), along with other anode-supported cells using the conventional cobaltite-electrolyte composite cathode (see, e.g., Xia, C.; Chen, F.; Liu, M. "Reduced-Temperature SOFCs using Ceria-Based Electrolytes Fabricated by Screen Printing", Electrochemical and Solid-State Letters 2001, 4, A52, Zhang, X.; Robertson, M.; Yick, S.; De Petit, C.; Styles, E.; Qu, W.; Xie, Y. S.; Hui, R.; Roller, J.; Kesler, O.; Maric, R.; Ghosh, D. "$Sm_{0.5}Sr_{0.5}CoO_3+Sm_{0.2}Ce_{0.8}O_{1.9}$ Composite Cathode for Cermet Supported Thin $Sm_{0.2}Ce_{0.8}O_{1.9}$ Electrolyte SOFC Operating Below 600° C.", Journal of Power Sources 2006, 160, 1211, and Wang, Z. C.; Weng, W. J.; Chen, K.; Shen, G.; Du, P. Y.; Han, G. R. "Preparation and Performance of Nanostructured Porous Thin Cathode for Low-Temperature Solid Oxide Fuel Cells by Spin-Coating Method", Journal of Power Sources 2008, 175, 430, all incorporated by reference herein) while with the similar electrolyte and anode. It can be seen that cells with the novel impregnated cathode architecture have much improved cell performance: the power output is more than doubled while the cathode interfacial resistance ($R_p$) is greatly dropped.

Figure 7:
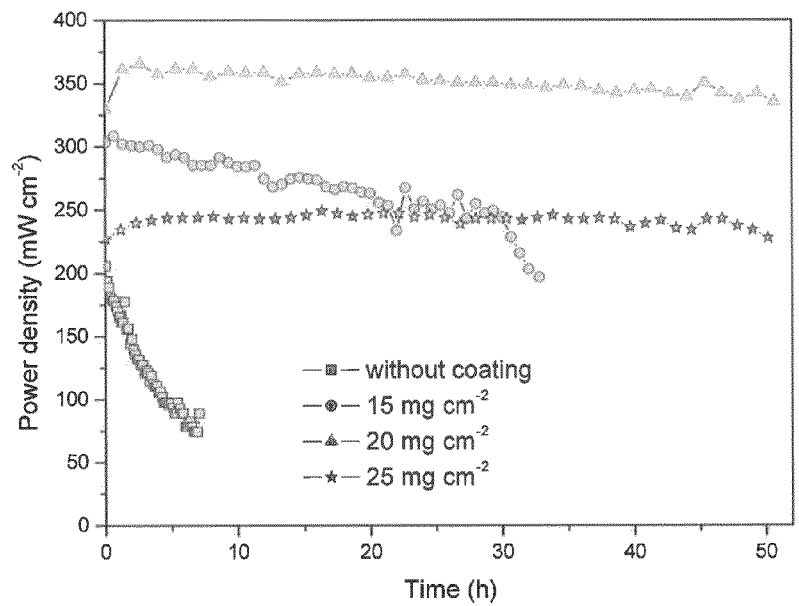
FIG. 7 illustrates performance for cells with different SDC coating on Ni-SDC anode substrates tested at 600° C. in accordance with certain aspects of the present disclosure.

In addition, single cells with SDC infiltrated porous Ni-SDC anode substrates have proved to be very effective in suppressing carbon deposition on the Ni surface. Preliminary data of the stability of the cells with different infiltrated SDC loadings operated with methane as fuel is shown in FIG. 7. No significant degradation was observed for Ni-SDC anode infiltrated by 25 mgcm$^{-2}$ SDC. The high performance of infiltrated SDC anodes showed high promise in developing SOFCs with direct oxidation of hydrocarbon fuels.

Figure 8:
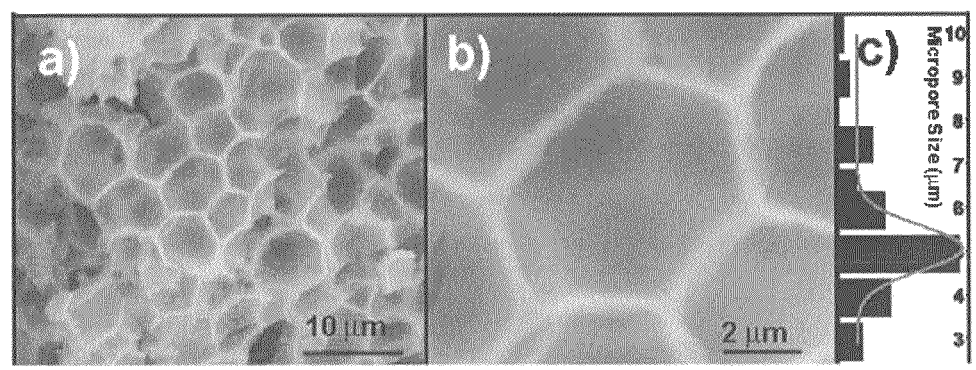
FIG. 8 illustrates SEM at increasing magnification (a), (b) and macropore size distribution (c) of the LSCF sample calcined at 900° C. in accordance with certain aspects of the present disclosure.

Compared with the previously reported methods to prepare hierarchically porous microstructures, the self-rising approach demonstrates the following remarkable advantages: 1) cost effectiveness as metal nitrites together with urea can be used as the precursors, eliminating the need of expensive hard template material typically employed from the other approaches; 2) versatile as not only single metal oxide but also mixed metal oxide can be successfully obtained; 3) simple and reproducible as preliminary work shows that the self-rising approach is an efficient way to get hierarchically porous metal oxides with extremely low filled density and high BET surface area (see, e.g., Liu, Q.; Zhao, F.; Dong, X.; Yang, C.; Chen, F. "Synthesis and Application of Porous $Sm_{0.2}Ce_{0.8}O_{1.9}$ Nano-crystal aggregates", Journal of Physical Chemistry 2009, 113, 17262, incorporated by reference herein). Using the self-rising approach, hierarchically porous LSCF ($La_{0.6}Sr_{0.4}Co_{0.2}Fe_{0.8}O_3$) has been obtained, as shown in FIG. 8(a), FIG. 8(b) revealing a three dimensional honeycomb like morphology. Large fractions of the sample have highly ordered porous structures in three dimensions over a range of hundreds of micrometers. X-ray diffraction (XRD) results indicate that the LSCF is highly crystalline and the energy dispersive X-ray (EDX) analysis confirms its composition. One significant feature of this self-rising approach is that the high temperature calcination does not destroy the hierarchically porous structure. This is quite different from previous reports in which, even after calcinations at 500° C., macroporous metal oxides started to collapse when using a hard template. The larger and thicker channel walls in LSCF most likely lead to enhanced thermal stability of the macropores. The average macropore diameter of LSCF (FIG. 8c) is about 5 µm. TEM image analysis shows that mesopores with average pore size of a few nanometers are formed on the walls of the macropores.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed is:

1. A solid oxide fuel cell comprising:

A cathode comprising a porous cathode support, the porous cathode support comprising samaria doped ceria (SDC) with an impregnated cobaltite active material deposited thereon, the cobaltite active material comprising $La_{0.6}Sr_{0.4}CoO_3$, the porous cathode support comprising macropores and mesopores, each macropore having a pore size of greater than 50 nm and 10 micrometers or less, and each mesopore having a pore size from 2 to 50 nm;

an electrolyte comprising samaria doped ceria (SDC); and an anode comprising an anode support, the anode support comprising nickel-samaria doped ceria (Ni-SDC) with samaria doped ceria (SDC) nanoparticles deposited thereon, the SDC nanoparticles catalyzing oxidation of a hydrocarbon fuel, wherein the cathode support, electrolyte, and anode support are joined together and form an integral component and wherein the solid oxide fuel cell operates a temperature of between 400° C. and 600° C.

2. The solid oxide fuel cell of claim 1, wherein the solid oxide fuel cell operates at a temperature of 550° C. or less.

3. The solid oxide fuel cell of claim 1, wherein the solid oxide fuel cell operates at a temperature of 500° C. or less.

4. The solid oxide fuel cell of claim 1, wherein the solid oxide fuel cell operates at a temperature of 450° C. or less.

5. A method for forming a solid oxide fuel cell comprising:

forming a cathode, the cathode comprising a porous cathode support, the porous cathode support comprising samaria doped ceria (SDC);

depositing a cobaltite active material on the cathode support such that the cobaltite active material is impregnated on the cathode support, the cobaltite active material comprising $La_{0.6}Sr_{0.4}CoO_3$, the porous cathode support comprising macropores and mesopores, each macropore have a pore size of greater than 50 nm and 10 micrometers or less, and each mesopore having a pore size from 2 to 50 nm;

forming an anode, the anode comprising an anode support, the anode support comprising nickel-samaria doped ceria (Ni-SDC);

depositing samaria doped ceria (SDC) nanoparticles on the anode support, the SDC nanoparticles catalyzing oxidation of a hydrocarbon fuel;

co-sintering the cathode support and the anode support with an electrolyte therebetween to form an integral component, wherein the electrolyte comprises samaria doped ceria (SDC), wherein the solid oxide fuel cell is capable of operating at a temperature of between 400° C. and 600° C.

\* \* \* \* \*